United States Patent [19]

Chen

[11] Patent Number: 5,288,044

[45] Date of Patent: Feb. 22, 1994

[54] CAMERA TRIPOD HEAD ASSEMBLY

[76] Inventor: Chien-Shu Chen, 4th Fl., No. 2-3, Lane 313, Chang An St., Lu Chou Hsiang, Taipei Hsien, Taiwan

[21] Appl. No.: 93,870

[22] Filed: Jul. 20, 1993

[51] Int. Cl.$^5$ .......................................... F16M 11/12
[52] U.S. Cl. ................................... 248/183; 248/178
[58] Field of Search ....................... 248/178, 179, 183

[56] References Cited

U.S. PATENT DOCUMENTS

| 2,145,584 | 1/1939 | Chamberlain, Jr. | 248/179 |
| 2,556,598 | 6/1951 | Rasine | 248/179 |
| 4,697,772 | 10/1987 | Kosugi et al. | 248/183 |

*Primary Examiner*—Hien H. Phan
*Attorney, Agent, or Firm*—Morton J. Rosenberg; David I. Klein

[57] ABSTRACT

A tripod head assembly having a tripod head joined with a handle by means of a coupler. The tripod head has a neck. The coupler has (a) a first member having a first end, a second end (b) a second member having a first end, a second end through which a passage is formed, a slit formed in the second end of the second member, thus forming a clamp through which a passage is formed and (c) a block with a passage wherein a number of teeth are formed, the block formed together with the second end of the second member. The first end of the first member is linked to the first end of the second member and the second end of the first member is linked to the block to form a hole for receiving the neck. The handle has a slender tip wherein a threading is formed and a number of teeth formed near the tip. A bolt has a shank and a slender tip on which a threading is formed. The tip of the bolt is insertable through the passage formed in the second end of the second member and the passage formed in the clamp. The tip of the handle is insertable through the passage formed in the block. The threadings engage with each other. The shank pushes the clamp towards the first member so as to clamp the neck. The teeth formed on the handle engage with the teeth formed on the block. The handle is retained in position.

6 Claims, 5 Drawing Sheets

CAMERA TRIPOD HEAD ASSEMBLY

BACKGROUND OF INVENTION

1. Field of Invention

The present invention relates to a tripod head assembly including a tripod head joined with a handle by means of a coupler.

2. Related Prior Art

U.S. patent application Ser. No. 07/984,556 filed by the same applicant teaches a tripod head to which a handle is adjustably linked so that the handle is suitable for manipulation by either the left or right hand of a user.

SUMMARY OF INVENTION

The present invention provides a tripod head assembly including a tripod head joined with a handle by means of a coupler. The tripod head assembly has a tripod head joined with a handle by means of a coupler. The tripod head has a neck. The coupler has (a) a first member having a first end, a second end and a cutout between the first and second ends, (b) a second member having a first end, a second end through which a passage is formed and a cutout between the first and second ends thereof, a slit formed in the second end of the second member, thus forming a clamp through which a passage is formed and (c) a block with a passage wherein a number of teeth are formed, the block formed together with the second end of the second member. The first end of the first member is linked to the first end of the second member and the second end of the first member is linked to the block so that the cutouts mate with each other so as to form a hole for receiving the neck. The handle has a slender tip wherein a threading is formed and a number of teeth formed near the tip. A bolt has a shank and a slender tip on which a threading is formed. The tip of the bolt is insertable through the passage formed in the second end of the second member and the passage formed in the clamp. The tip of the handle is insertable through the passage formed in the block. The threadings engage with each other. The shank pushes the clamp towards the first member so as to clamp the neck. The teeth formed on the handle engage with the teeth formed on the block. The handle is retained in position.

DETAILED DESCRIPTION OF INVENTION

The applicant's co-pending U.S. patent application Ser. No. 07/984,556 is incorporated for reference.

Figure 1:
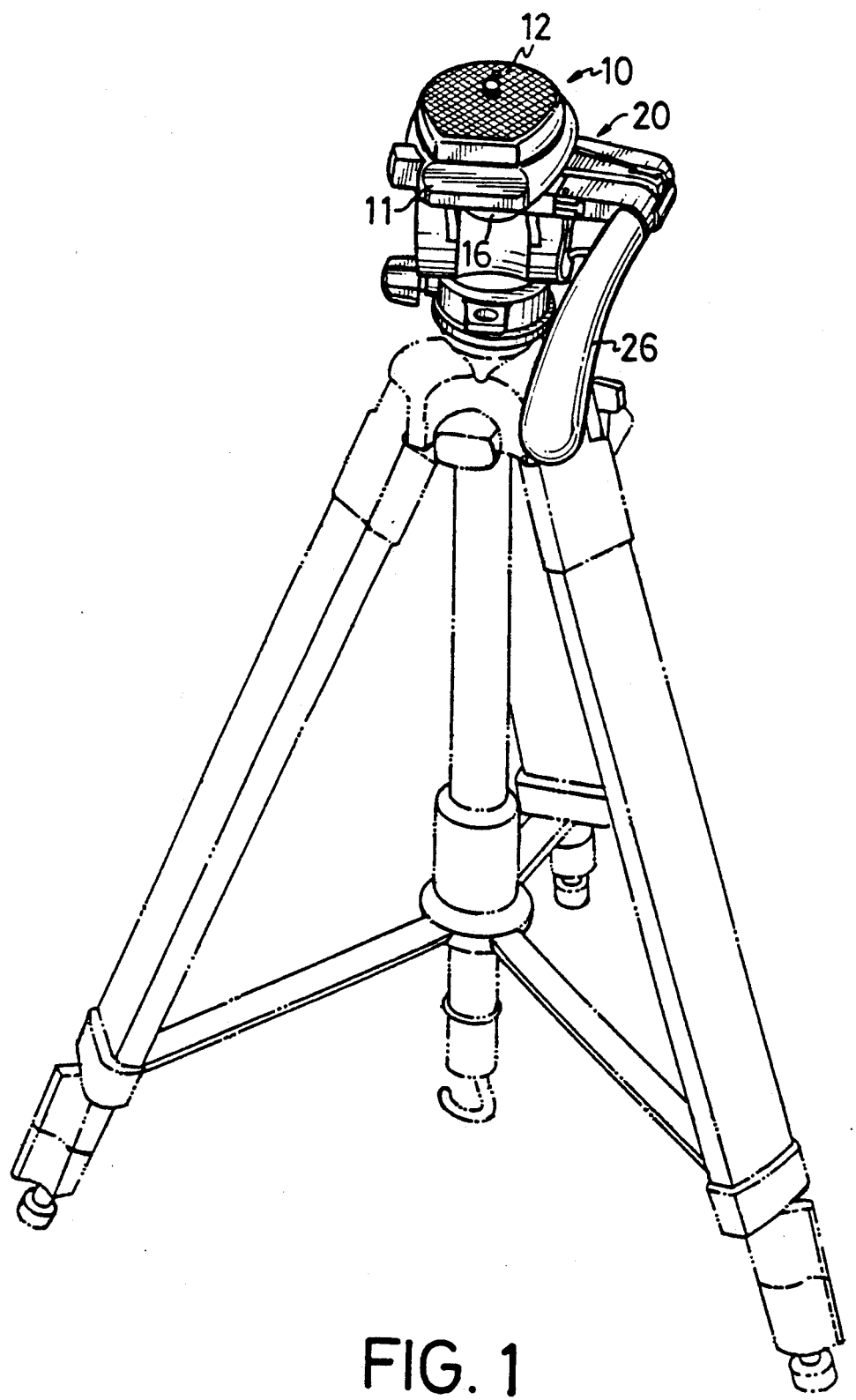
FIG. 1 is a perspective view of a tripod head assembly consisting of a tripod head, a handle and a coupler by which the handle is adjustably mounted on the tripod head in accordance with the present invention.

Referring to the FIG. 1 of the drawings, a tripod head assembly consists of a mounting plate 12 and a tripod head 10 having a camera platform 11 and a neck 16 formed on the underside of the platform 11 and a handle 26. The mounting plate 12 and the camera platform 11 are identical, in configuration and function, to those taught in U.S. patent application Ser. No. 07/984,556.

Figure 2:
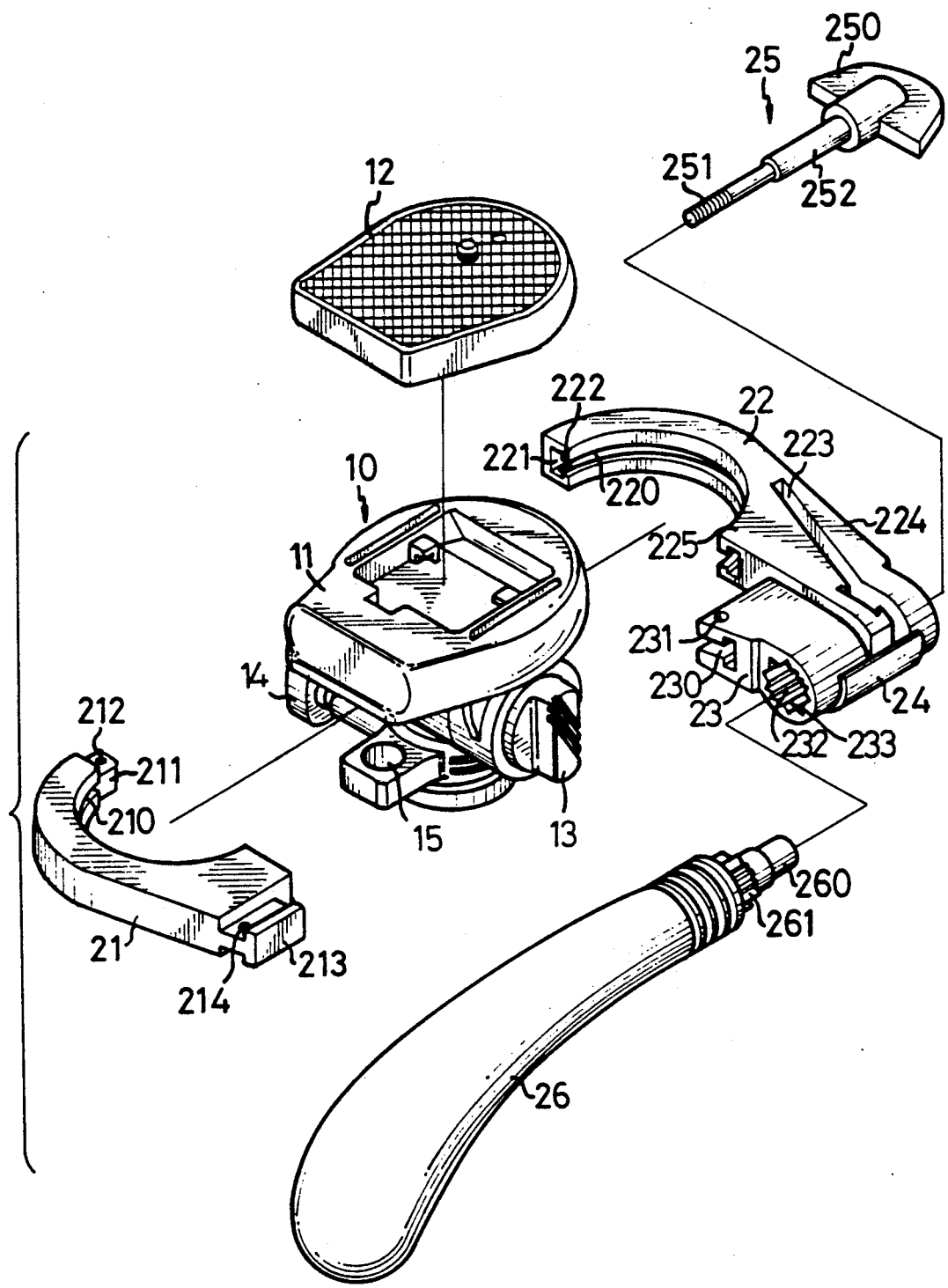
FIG. 2 is an exploded view of the tripod head assembly in accordance with the present invention.
Figure 3:
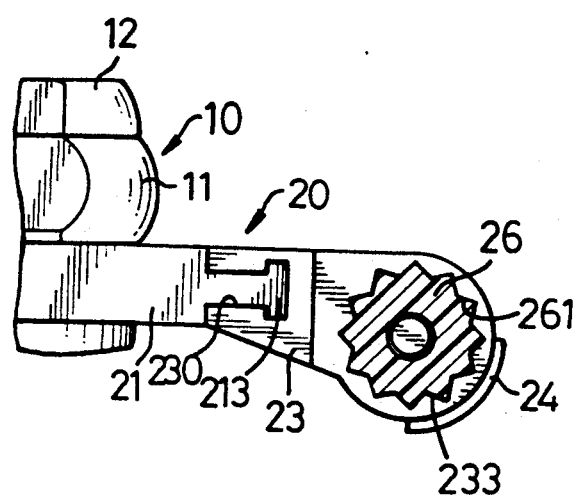
FIG. 3 is a partial side view of the coupler.

Referring to FIGS. 2 and 3, two flanges (not shown) are circumferentially formed on the neck 16. The grip 26 is attached to the neck 16 by means of the coupler 20 having two members 21 and 22.

The member 21 defines a semi-circular cutout so as to form a semi-cylindrical wall wherein a groove 210 is formed. The semi-cylindrical wall of the member 21 matches the neck 16, the groove 210 matches the flanges formed on the neck 16. A tongue 211 longitudinally protrudes from a first end of the member 21. A hole 212 is formed through the tongue 211. A T-shaped slide 213 is formed on a second end of the member 21 such that the length of the tongue 210 is parallel to that of the slide 42. The T-shaped slide 213 has a horizontal body and a vertical flange. A hole 214 is vertically formed through the body of the slide 213.

The member 22 defines a semi-circular cutout so as to form a semi-cylindrical wall wherein a groove 220 is formed. The semi-cylindrical wall of the member 22 matches the neck 16, the groove 220 matches the flanges formed on the neck 16. The member 22 defines, in a first end thereof, a recess 221 for receiving the tongue 211. A hole 222 is formed in the first end of the member 22. A slit 223 is formed in a second end of the member 22 so as to divide the second end of the member 22 into a portion 224 and a clamp 225. A passage is formed through the portion 224. A passage is formed through the clamp 225. The passage formed through the portion 224 aligns with the passage formed through the clamp 225.

A block 23 defines a T-shaped slot 230 for receiving the slide 213 and a hole 231 corresponding to the hole 214. As shown in FIG. 3, the block 23 also defines a passage 232 with a number of teeth 233 radially outwardly extending therefrom. The block 23 is formed together with the member 22 by means of a strip 24 such that the passage 232 aligns with the passages formed in the portion 224 and clamp 225.

A bolt 25 is attached to an ear 250 for rotating the bolt 25. The bolt 25 has a shank 252 and a tip 251 on which a threading extends. The diameter of the tip 251 is smaller than that of the shank 252.

The handle 26 has a tip 260 wherein a threading (not shown) extends and a number of teeth 261 radially outwardly extending therefrom.

To link the member 21 to the member 22, the tongue 211 is inserted in the recess 221 and the slide 213 is inserted in the slit 223. The flanges formed on the neck 16 are received in the grooves 210 and 220. A screw is inserted through the hole 222 and is further secured in the hole 212. Another screw is inserted through the hole 231 and is further secured in the hole 214. Thus, the coupler 20 is formed. At this instant, the coupler 20 is rotatable about the neck 16.

The tip 260 and the teeth 261 are initially inserted in the passage 232. The diameter of the tip 251 of the bolt 25 is marginally smaller than that of the passage formed through the clamp 224 so that the tip 251 is insertable through the passage formed through the clamp 225. The diameter of the shank 252 is marginally smaller than that of the passage formed through the clamp 224 so that the shank 252 is insertable through the passage formed through the portion 224.

Figure 4:
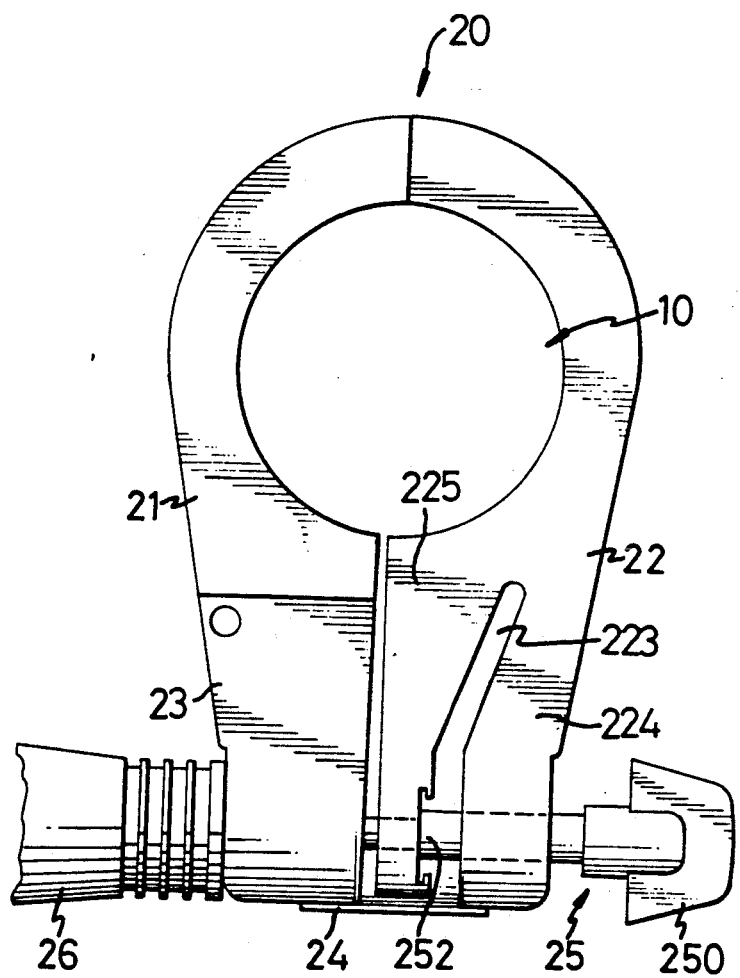
FIG. 4 is a top view of the coupler in a first position in accordance with the present invention.

By rotating the ear 250 in a direction, the threading formed on the tip 251 is engaged with the threading formed in the tip 260, so that the teeth 233 are engaged with the teeth 261 and that the handle 26 is maintained in position relative to the member 22. The clamp 225 is moved closer to the member 21 (see FIG. 4) by means of the shank 252, so that the neck 16 is clamped by the coupler 20.

Figure 5:
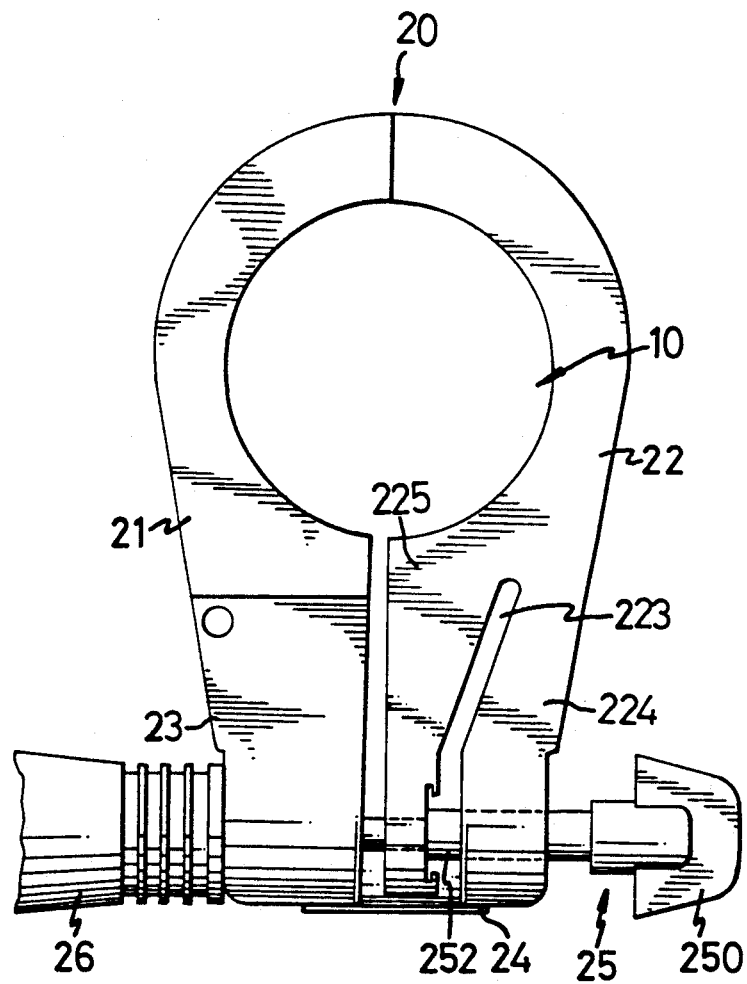
FIG. 5 is a top view of the coupler in a second position in accordance with the present invention.

By rotating the ear 250 in an opposite direction, the threading formed on the tip 251 is disengaged from the threading formed in the tip 260, so that the teeth 261 are released from the teeth 233 and that the handle 26 is rotatable relative to the member 22. At this instant, the clamp 23 is moved from the member 22 (see FIG. 5) so that the neck 16 is not clamped by the coupler 20. That is, the coupler 20 is rotatable relative to the tripod head.

Accordingly, the coupler 20 is rotatable with respect to the tripod head and the handle 26 is rotatable relative to the coupler 20 by rotating the bolt 25. That is, the handle 26 is easily adjustable.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. A tripod head assembly comprising:
   a tripod head comprising a neck;
   a coupler comprising:
      a first member comprising a first end, a second end and a cutout between the first and second ends;
      a second member comprising a first end comprising a passage formed therein, a second end comprising a passage formed therein, and a cutout between the first and second ends thereof, a slit formed in the second end of the second member, thus forming a clamp; and
      a block defining a passage wherein a number of teeth are formed, the block formed together with the second end of the second member;
      the first end of the first member linked to the first end of the second member and the second end of the first member linked to the block so that the cutouts mate with each other for forming a hole for receiving the neck;
   a handle comprising a slender tip wherein a threading is formed and a number of teeth formed near the tip; and
   a bolt comprising a shank and a slender tip on which a threading is formed;
   the tip of the bolt inserted through the passage formed in the clamp and the tip of the handle inserted through the passage formed in the block, thus allowing the threadings to engage with each other, so that the shank pushes the clamp towards the first member for clamping the neck and that the teeth formed on the handle engage with the teeth formed on the block for retaining the handle in position.

2. A tripod head assembly in accordance with claim 1, wherein the first end of the first member comprises a tongue formed thereon, the first end of the second member comprises a recess formed therein for receiving the tongue.

3. A tripod head assembly in accordance with claim 1, wherein the first end of the first member is attached to the first end of the second member by means of a screw.

4. A tripod head assembly in accordance with claim 1, wherein the second end of the first member comprises a slide formed thereon, the block comprises a slot formed therein for receiving the slide.

5. A tripod head assembly in accordance with claim 4, wherein the slide is formed as a rail, the slot has a compensated form of the slide.

6. A tripod head assembly in accordance with claim 1, wherein the second end of the first member is attached to the block by means of a screw.

* * * * *